(12) United States Patent
Menosky et al.

(10) Patent No.: US 6,994,627 B2
(45) Date of Patent: Feb. 7, 2006

(54) UNIVERSAL JOINT

(75) Inventors: Marc M. Menosky, Burt, MI (US); Salvatore N. Grupido, Rochester, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 4 days.

(21) Appl. No.: 10/412,924

(22) Filed: Apr. 14, 2003

(65) Prior Publication Data

US 2004/0204250 A1    Oct. 14, 2004

(51) Int. Cl.
*F16D 3/41*    (2006.01)

(52) U.S. Cl. ...................... 464/132; 464/136
(58) Field of Classification Search ............ 464/11–14, 464/120–136, 905, 906
See application file for complete search history.

(56) References Cited

U.S. PATENT DOCUMENTS

| | | | |
|---|---|---|---|
| 1,313,109 A * | 8/1919 | Ofeldt | ................. 464/136 |
| 1,391,756 A * | 9/1921 | Brush | ................. 464/14 X |
| 3,593,541 A * | 7/1971 | Kuroda | ................. 464/116 |
| 3,886,766 A * | 6/1975 | Selmek | ................. 464/11 X |
| 4,366,966 A | 1/1983 | Ratsko et al. | |
| 4,371,358 A | 2/1983 | Laue | |
| 4,874,349 A | 10/1989 | Gall | |
| 5,591,085 A | 1/1997 | Stall et al. | |
| 5,725,431 A | 3/1998 | Reynolds | |
| 5,813,916 A | 9/1998 | Lentini et al. | |
| 5,865,678 A | 2/1999 | Koedam et al. | |
| 6,129,634 A | 10/2000 | Nieman | |
| 6,162,126 A | 12/2000 | Barrett et al. | |
| 6,264,566 B1 | 7/2001 | Nieman et al. | |
| 6,280,335 B1 | 8/2001 | Wehner et al. | |
| 6,319,131 B1 * | 11/2001 | Lindenthal | ................. 464/132 |
| 6,336,868 B1 | 1/2002 | Kurecka et al. | |
| 6,357,757 B1 | 3/2002 | Hibbler et al. | |

* cited by examiner

*Primary Examiner*—Greg Binda
(74) *Attorney, Agent, or Firm*—Harness, Dickey & Pierce P.L.C.

(57) ABSTRACT

A universal joint includes a pair of bifurcated yokes interconnected by a cruciform. The cruciform includes four orthogonal trunnions each including a flared end section. A bearing is retained on the trunnion by the flared end section.

13 Claims, 4 Drawing Sheets

UNIVERSAL JOINT

BACKGROUND OF THE INVENTION

The present invention generally relates to a universal joint for use in a driveline of a motor vehicle. More specifically, the present invention pertains to a universal joint equipped with a mechanism for securing a bearing cup assembly to a cruciform trunnion.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The cruciform includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions. In addition, it is known to use a thrust washer between the trunnion and the bearing cup to absorb the radially-directed thrust forces which may occur therebetween.

SUMMARY OF THE INVENTION

During assembly of the universal joint, difficulties may arise when attempting to couple the bearing assemblies to the bifurcated yokes. Typically, each bearing assembly, thrust washer and bearing cup are positioned on a trunnion but not positively retained thereto. During the assembly process, the bearing cup and bearing assembly may be accidentally disrupted and separated from the trunnion. Gravitational forces may also cause separation of the components during the assembly process. Possible bearing contamination and loss of productivity may result. In some instances, extraneous straps, nets or other packaging are used to retain the bearing cup assemblies in place during shipping and handling. These straps must be removed and discarded by the end user requiring expense of time and cost. Accordingly, it would be advantageous to provide a universal joint having bearing cup assemblies which are retained on the trunnions without the use of external discardable devices.

The present invention is directed to a universal joint for interconnecting a pair of rotating shafts. The universal joint includes a pair of bifurcated yokes interconnected by a cruciform. The cruciform includes four orthogonal trunnions. Each trunnion includes a flared end section. Each flared end section retains a bearing assembly on the trunnion.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
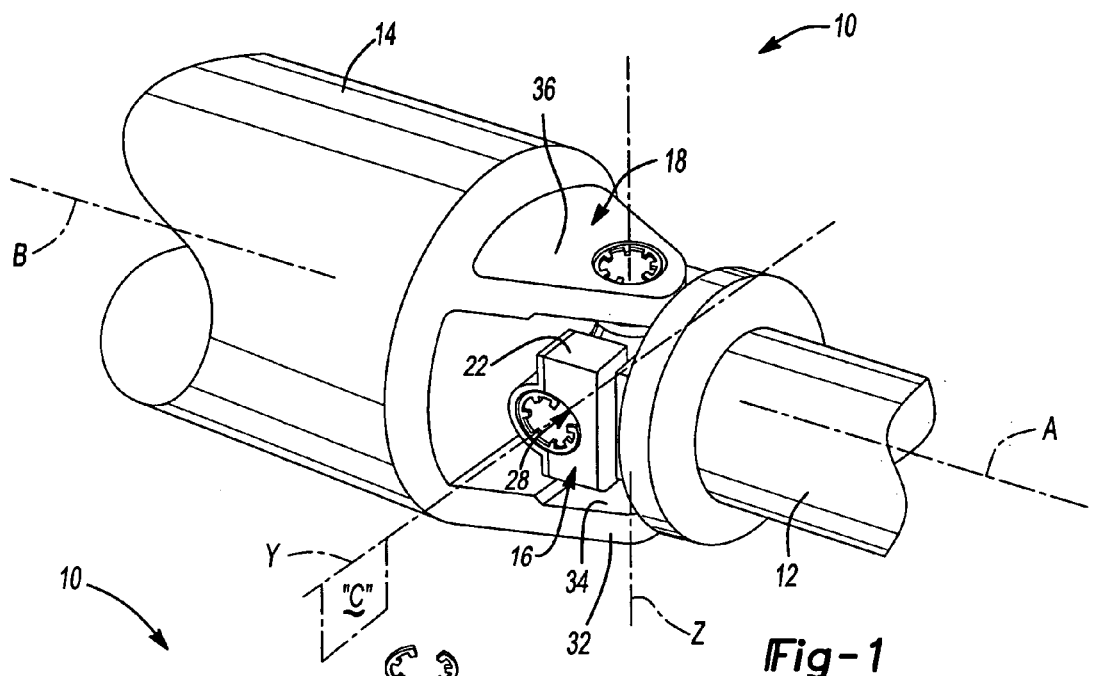
FIG. 1 is a perspective view of a universal joint according to the principals of the present invention.
Figure 2:
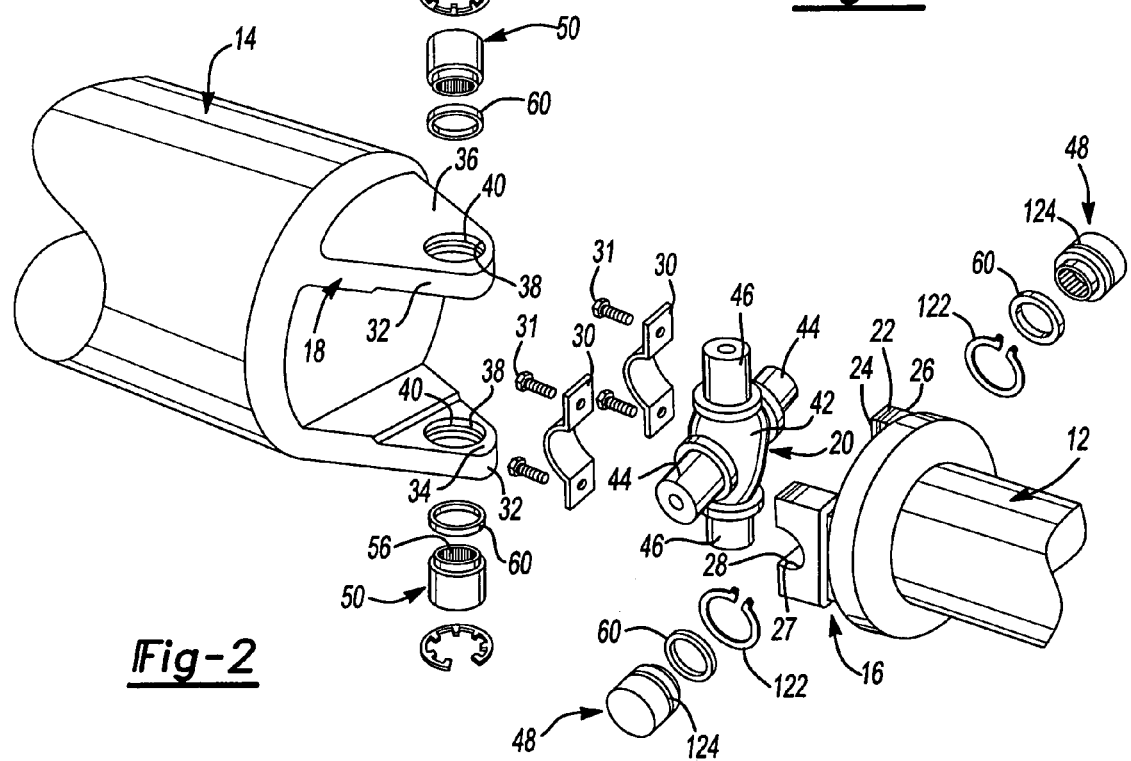
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with a journal 27 extending therebetween. Apertures 28 are formed by coupling a pair of end caps 30 to legs 22 via fasteners 31. End caps 30 cooperate with journals 27 to complete apertures 28. Apertures 28 are aligned on a first trunnion axis, as denoted by construction line "Y", which passes through and is orthogonal with respect to rotary axis "A" of first shaft 12.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are aligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring grooves 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis "Y". Similarly, second trunnions 46 are adapted to be inserted into apertures 38 in legs 32 of second yoke 18 so as to be axially aligned on second trunnion axis "Z". With first trunnions 44 and second trunnions 46 installed in first and second yokes 16 and 18, respectfully, trunnion axes "Y" and "Z" pass through a common plane "C" which orthogonally intersects the rotary axis of cruciform 20, as shown in FIG. 1.

Universal joint 10 also includes a first pair of bearing cup assemblies 48 adapted to be mounted in apertures 28 and a second pair of bearing cup assemblies 50 adapted to be mounted in apertures 38. First bearing cup assemblies 48 are provided for receiving and rotatably supporting first trunnions 44 in apertures 28. Similarly, second bearing cup assemblies 50 are provided for receiving and rotatably supporting second trunnions 46 in apertures 38. For purposes of brevity, the following description will be limited to the components of bearing cup assemblies 48 with the understanding that the corresponding components of bearing cup assembly 50 are substantially identical.

Figure 3:
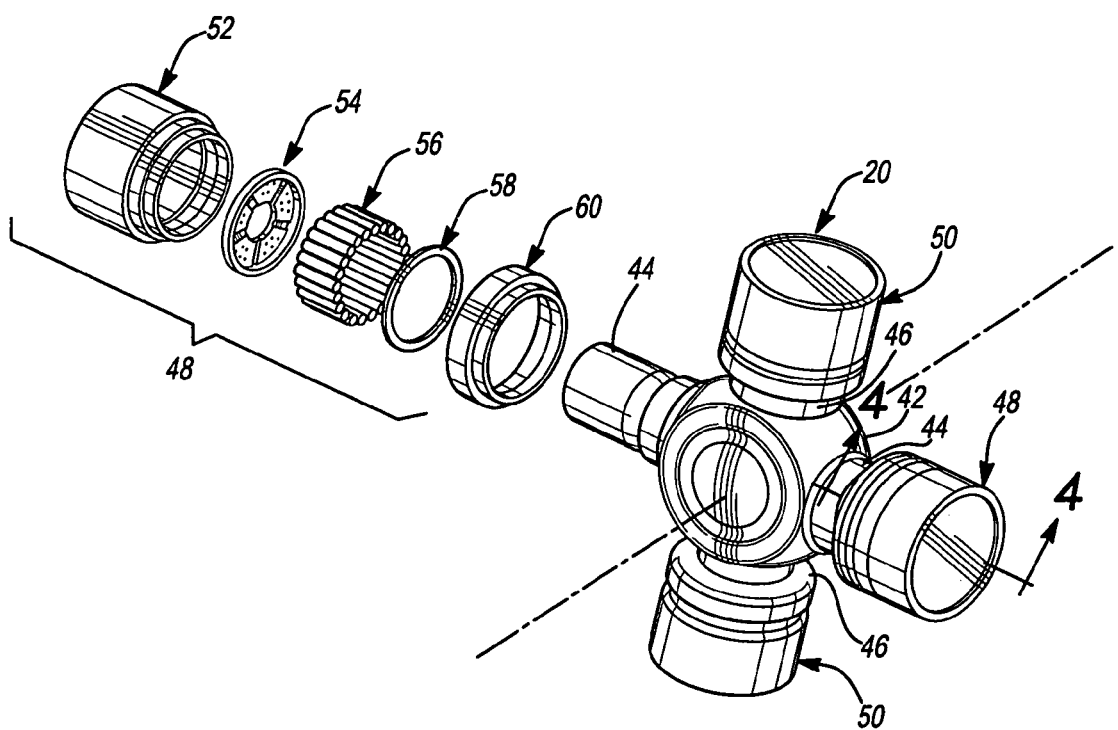
FIG. 3 is partial exploded perspective view of a trunnion and bearing cup assembly of the present invention.
Figure 4:
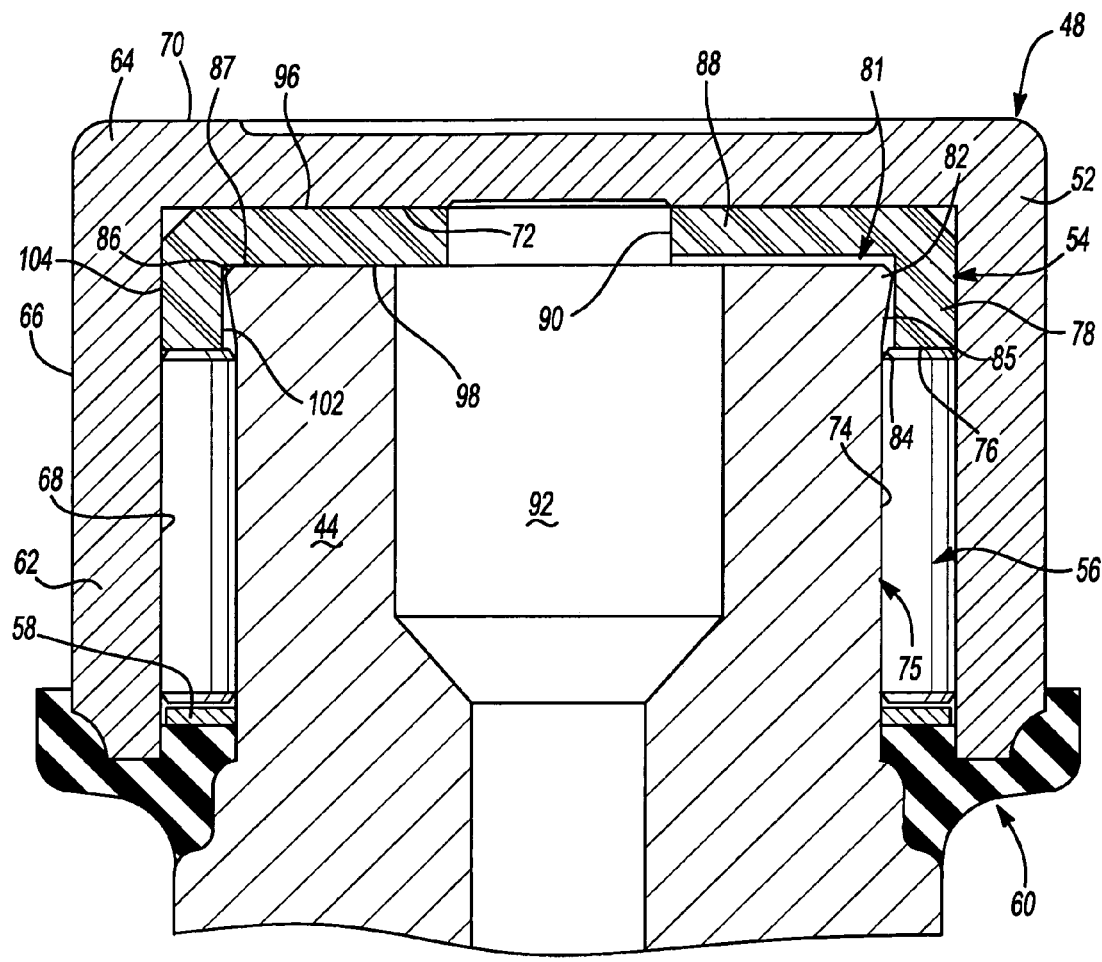
FIG. 4 is a partial cross-sectional side view of a universal joint including a trunnion and thrust washer constructed in accordance with the teachings of the present invention.

FIGS. 2–4 depict each bearing cup assembly 48 as including a bearing cup 52, a thrust washer 54, roller bearings 56, a seal washer 58 and an elastomeric seal 60. Bearing cup 52 is substantially hollow and cylindrical in shape. Bearing cup 52 includes a substantially cylindrical tubular segment 62 closed at one end by an end segment 64. Tubular segment 62 includes an outer wall surface 66 and an inner wall surface 68. End segment 64 includes an outer surface 70 and an inner surface 72. Roller bearings 56 are positioned between inner wall surface 68 and an outer wall surface 74 of a substantially cylindrical portion 75 of trunnion 44 to allow relative rotary movement between bearing cup 52 and trunnion 44. Roller bearings 56 are oriented to rotate on an axis parallel to axis "Y" of trunnions 44 and are arranged in a circumferential array about this axis. One end of each roller bearing 56 is supported to roll against the bearing surface 76 formed on a circumferential flange segment 78 of thrust washer 54. The opposite ends of roller bearings 56 are captured by seal washer 58 which, in turn, is retained by seal 60. Seal 60 extends between outer wall surface 66 of bearing cup 52 and outer wall surface 74 of trunnion 44 to protect roller bearings 56 from contamination and to retain lubricant within bearing cup assembly 48.

As best shown in FIG. 4, trunnion 44 includes a flared end 81 positioned adjacent substantially cylindrical portion 75 to assist in retaining the respective bearing cup assembly on the trunnion during universal joint assembly. Flared end 81 includes a protrusion 82 circumferentially extending about trunnion 44. Protrusion 82 extends radially outwardly beyond outer wall surface 74 of substantially cylindrical portion 75. Protrusion 82 includes a detent 84, a retaining surface 85 and a chamfer 86. Detent 84 is formed at the transition between outer wall surface 74 and retaining surface 85. Chamfer 86 provides a lead for installing roller bearings 56 and thrust washer 54. Chamfer 86 interconnects protrusion 82 and an end surface 87 of trunnion 44.

To assemble universal joint 10, first bearing cup assemblies 48 and second bearing cup assemblies 50 are installed on the respective trunnions. Protrusion 82 is sized to provide a minor interference with roller bearings 56. Specifically, roller bearings 56 define an inner diameter having a size less than a maximum diameter of protrusion 82. Because the roller bearings are harder than the trunnion, protrusion 82 is slightly deformed or scuffed as roller bearings 56 are axially translated over trunnion 44. Once properly positioned, roller bearings 56 engage outer wall surface 74 of substantially cylindrical portion 75.

Thrust washer 54 includes a disk segment 88 from which circumferential flange segment 78 extends. A central aperture 90 extends through disk segment 88 and is in communication with a lubricant passage 92 found in each trunnion. A fitting (not shown) mounted on central hub 42 of cruciform 20 communicates with lubricant passage 92. The fitting is used to supply lubricant to passage 92 for lubricating roller bearings 56 as well as for providing lubricant film between relatively movable surfaces. Disk segment 88 includes an outer face surface 96 which faces and contacts inner surface 72 of bearing cup 52. Disk segment 88 also includes an inner face surface 98 which faces and contacts end surface 87 of trunnion 44. Inner face surface 98 and outer face surface 96 are substantially parallel such that disk segment 88 has a constant thickness. In addition, thrust washer 54 includes a circumferential inner wall surface 102 and a circumferential outer wall surface 104, as defined by flange segment 78. Circumferential inner wall surface 102 is adapted to face outer wall surface 74 of trunnion 44. Circumferential outer wall surface 104 faces inner wall surface 68 of bearing cup 52. As such, thrust washer 54 functions to align bearing cup 52 and trunnion 44.

Figure 5:
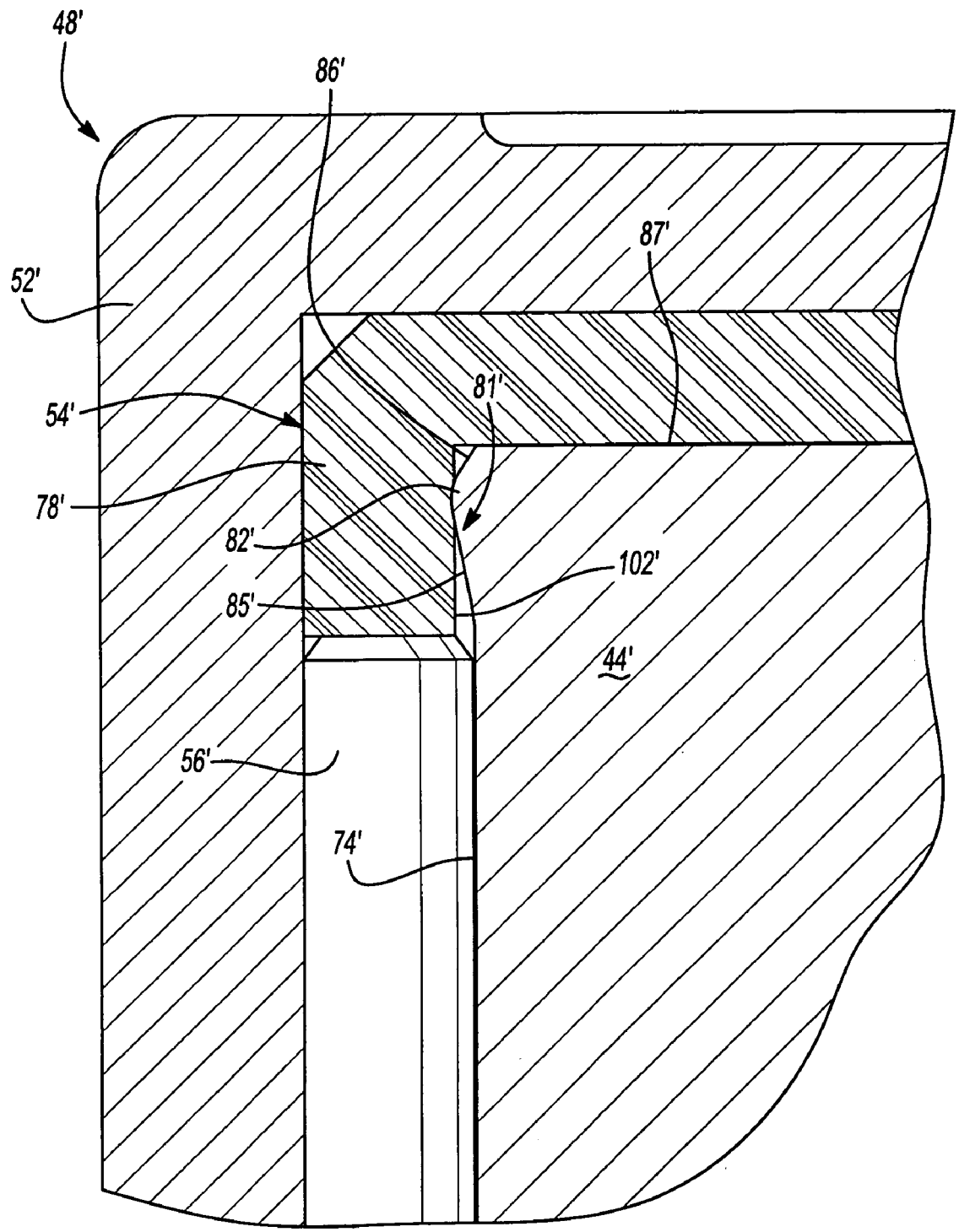
FIG. 5 is a partial cross-sectional side view of an alternate embodiment of a trunnion and thrust washer constructed in accordance with the teachings of the present invention.

In FIG. 5, an alternate embodiment thrust washer 54' is shown. Thrust washer 54' includes a circumferential flange segment 78' which defines a cylindrical aperture having an inner diameter slightly smaller than the outer diameter defined by protrusion 82'. During installation, chamfer 86' guides a circumferential inner wall surface 102' of flange segment 78' over protrusion 82'. Because thrust washer is constructed from a resilient material such as injection molded nylon, at least a portion of circumferential flange segment 78' springs back to engage retaining surface 85' in a snap-fit arrangement. In this manner, thrust washer 54' and roller bearings 56' are retained on trunnion 44'. One skilled in the art will appreciate that flared end 81' is positioned outboard of outer wall surface 74' and does not interfere with proper roller bearing function once each bearing cup assembly has been coupled to a respective trunnion.

Once bearing cup assemblies 48 and 50 are installed on trunnions 44 and 46, the bearing cup assemblies are inserted into leg apertures 28 and 38. Thereafter, cruciform 20 is centered, dynamically balanced and coupled to legs 22 and 32. A variety of methods for securing yokes 16 and 18 to cruciform 20 are available. One method includes mounting a snap ring 122 within a circumferential groove 124 formed on outer wall surface 66 of bearing cup 52. Snap ring 122 engages inboard surface 24 to retain the bearing assembly. Alternatively, portions of outboard surface 26 surrounding apertures 28 may be deformed using processes such as staking or peening to create local areas which engage outer surface 70 of bearing cup 52. Another method involves injecting molten resin within a passageway extending between the leg and the bearing cup. The molten resin solidifies to retain the bearing cup within the aperture of the leg. Yet another retention method incorporates the use of projections (not shown) extending from legs 22 which may be deformed to engage snap ring 122 against outer surface 70 of bearing cup 52. One or more of these methods is disclosed in commonly-owned U.S. Pat. Nos. 6,280,335, 6,162,126 and 6,336,868, the entire disclosure of each being hereby incorporated by reference.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A universal joint comprising:
   a yoke including a leg having an aperture extending therethrough;
   a cruciform having an integral trunnion, said trunnion including a substantially cylindrical portion and a flared portion at a distal end thereof, wherein the flared portion includes a protrusion extending radially outwardly beyond an outer surface of said substantially cylindrical portion; and
   a bearing assembly including a bearing cup and a bearing, said bearing being rotatably positioned on said substantially cylindrical portion and positioned within said bearing cup, said bearing cup including a substantially cylindrical side wall closed at one end by an integral end wall, said cylindrical side wall encompassing said flared portion, wherein said bearing defines an inner diameter having a size less than a maximum diameter of said flared portion.

2. The universal joint of claim 1 further including a thrust washer positioned at said distal end of said trunnion adjacent said bearing, said thrust washer having a circumferential flange engaging said flared portion of said trunnion.

3. The universal joint of claim 2 wherein said thrust washer is coupled to said trunnion in a snap-fit arrangement.

4. The universal joint of claim 1 wherein said protrusion is at least partially deformed during positioning of said bearing on said substantially cylindrical portion.

5. The universal joint of claim 1 wherein said flared portion includes a tapered surface extending axially inwardly and radially outwardly from said distal end toward said protrusion and a retaining surface extending radially inwardly from said protrusion to said substantially cylindrical portion.

6. The universal joint of claim 5 further including a thrust washer at least partially engaging said retaining surface.

7. A universal joint comprising:
   a yoke including a leg having an aperture extending therethrough;
   a cruciform having integral trunnions, one of said trunnions including a substantially cylindrical portion and a radially outwardly flared portion at its distal end;
   a plurality of elongated, cylindrically shaped members encompassing said cylindrical portion, said flared portion engaging a thrust washer for restricting axial movement of said plurality of cylindrically shaped members; and
   a bearing cup positioned over said distal end, said plurality of cylindrically shaped members being positioned within said bearing cup to define an inner bearing diameter smaller than a diameter defined by said flared portion.

8. The universal joint of claim 7 wherein said flared portion circumferentially extends about said one trunnion and includes a tapered surface radially extending from a diameter less than said inner bearing diameter to a diameter greater than said inner bearing diameter.

9. The universal joint of claim 8 wherein said thrust washer having a substantially planar body engaging an end face of said one trunnion, said thrust washer including a substantially cylindrical wall having an inner surface in engagement with said flared portion.

10. The universal joint of claim 9 wherein said cylindrical wall of said thrust washer is positioned adjacent to an end face of one of said elongated cylindrically shaped members.

11. The universal joint of claim 10 wherein an interference fit exists between said plurality of elongated cylindrically shaped members and said flared portion during assembly of said bearing cup and said cylindrically shaped members to said one trunnion.

12. A universal joint comprising:
   a yoke including a leg having an aperture extending therethrough;
   a cruciform having a trunnion, said trunnion including a substantially cylindrical portion and a flared portion at a distal end thereof, wherein the flared portion includes a protrusion extending radially outwardly beyond an outer surface of said substantially cylindrical portion;
   a bearing rotatably positioned on said substantially cylindrical portion, wherein said bearing defines an inner diameter having a size less than a maximum diameter of said flared portion; and
   a thrust washer positioned at said distal end of said trunnion adjacent said bearing, said thrust washer having a circumferential flange engaging said flared portion of said trunnion.

13. The universal joint of claim 12 wherein said thrust washer is coupled to said trunnion in a snap-fit arrangement.

* * * * *